United States Patent
Xu et al.

(10) Patent No.: US 11,011,192 B1
(45) Date of Patent: May 18, 2021

(54) METHOD OF BUILDING SELF-ALIGNED OPTICAL SIDE SHIELD STRUCTURE

(71) Applicant: Headway Technologies, Inc., Milpitas, CA (US)

(72) Inventors: Weihao Xu, San Jose, CA (US); Ittetsu Kitajima, Cupertino, CA (US); Cherng-Chyi Han, San Jose, CA (US); Xuhui Jin, Sunnyvale, CA (US); Weisheng Hu, Fremont, CA (US); Ethan Lo, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 16/800,036

(22) Filed: Feb. 25, 2020

(51) Int. Cl.
*G11B 5/39* (2006.01)
*G11B 5/60* (2006.01)
*G11B 5/00* (2006.01)

(52) U.S. Cl.
CPC ............. *G11B 5/39* (2013.01); *G11B 5/6082* (2013.01); *G11B 2005/0021* (2013.01)

(58) Field of Classification Search
CPC . G11B 5/3912; G11B 2005/0021; G11B 5/39; G11B 5/6082; G11B 5/3136
USPC .................. 360/125.1–125.5, 125.31–125.35
See application file for complete search history.

(56) References Cited

U.S. PATENT DOCUMENTS

| | | | |
|---|---|---|---|
| 6,999,384 B2 | 2/2006 | Stancil et al. | |
| 7,272,102 B2 | 9/2007 | Challener | |
| 7,649,712 B2 | 1/2010 | Le et al. | |
| 8,000,178 B2 | 8/2011 | Shimazawa et al. | |
| 8,295,132 B2 | 10/2012 | Jin et al. | |
| 8,488,419 B1 | 7/2013 | Jin et al. | |
| 8,599,656 B2 | 12/2013 | Jin et al. | |
| 8,630,153 B1 | 1/2014 | Wang et al. | |
| 8,691,102 B1 | 4/2014 | Araki et al. | |
| 8,773,803 B2 | 7/2014 | Jin et al. | |
| 8,804,468 B2 | 8/2014 | Zhao et al. | |
| 8,811,127 B1* | 8/2014 | Hirata | G11B 5/314 369/13.33 |
| 8,817,581 B1* | 8/2014 | Tsutsumi | G11B 5/6088 369/13.13 |
| 8,953,421 B2 | 2/2015 | Peng et al. | |
| 9,013,966 B1* | 4/2015 | Matsumoto | G11B 5/3116 369/13.32 |
| 9,019,803 B1 | 4/2015 | Jin et al. | |
| 9,025,422 B2 | 5/2015 | Aoki et al. | |
| 9,042,209 B2 | 5/2015 | Balamane et al. | |
| 9,053,717 B1 | 6/2015 | Matsumoto et al. | |
| 9,064,515 B2 | 6/2015 | Zhao et al. | |
| 9,099,112 B1 | 8/2015 | Balamane et al. | |
| 9,129,620 B2 | 9/2015 | Cheng et al. | |
| 9,466,320 B1 | 10/2016 | Staffaroni et al. | |

(Continued)

*Primary Examiner* — Allen T Cao
(74) *Attorney, Agent, or Firm* — Saile Ackerman LLC; Stephen B. Ackerman (57) ABSTRACT

An optically shielded (thermally assisted magnetic recording (TAMR) head comprises a perpendicular magnetic recording (PMR) write head and a near-field transducer (NFT) having an emerging peg at the air-bearing surface (ABS). Self-aligned optical side shields (SA-OSS) are formed using a self-aligning process that positions the shields symmetrically relative to the emergent peg of the NFT. As a result of the symmetric positioning the down-track and cross-track near-field and near-field gradients are significantly sharpened.

12 Claims, 4 Drawing Sheets

(56) References Cited

U.S. PATENT DOCUMENTS

| | | | |
|---|---|---|---|
| 9,685,202 | B1 | 6/2017 | Duda et al. |
| 9,786,311 | B2 | 10/2017 | Chen |
| 9,852,752 | B1 | 12/2017 | Chou et al. |
| 10,068,596 | B2 | 9/2018 | Staffaroni et al. |
| 10,186,288 | B1 | 1/2019 | Xu et al. |
| 10,249,333 | B2 | 4/2019 | Maletzky et al. |
| 10,262,683 | B2 | 4/2019 | Staffaroni et al. |
| 10,381,032 | B2 | 8/2019 | Le et al. |
| 2011/0222190 | A1* | 9/2011 | Hara .................. G11B 5/314 360/234.6 |
| 2012/0092971 | A1 | 4/2012 | Schreck et al. |
| 2015/0255097 | A1 | 9/2015 | Zhao et al. |
| 2017/0221505 | A1 | 8/2017 | Staffaroni et al. |
| 2017/0249962 | A1 | 8/2017 | Peng |
| 2018/0096702 | A1 | 4/2018 | Staffaroni et al. |

\* cited by examiner

METHOD OF BUILDING SELF-ALIGNED OPTICAL SIDE SHIELD STRUCTURE

This Application is related to Ser. No. 15/686,471, Filing Date: Aug. 25, 2017, issued Apr. 2, 2019 as U.S. Ser. No. 10/249,333; to Ser. No. 15/285,721, Filing Date: Oct. 5, 2016, issued as U.S. Ser. No. 10/069,596 on Sep. 4, 2018 and to Ser. No. 15/966,179, Filing Date: Apr. 30, 2018 issued Jan. 22, 2019 as U.S. Pat. No. 1,018,628, each assigned to a common assignee and fully incorporated herein by reference.

BACKGROUND

1. Technical Field

This disclosure relates to magnetic write heads that write on magnetic recording media, particularly to write heads that use Thermally Assisted Magnetic Recording (TAMR) enabled by the absorption of plasmon near-field energy.

2. Description

As hard disk drives have been increasing the recording density of the magnetic disks on which data storage occurs, the thin-film magnetic heads used to write and read that data have been required to improve their performance as well. The thin-film read/write heads most commonly in use are of a composite type, having a structure in which a magnetism detecting device, such as a tunneling magnetoresistive (TMR) read sensor is used together with a magnetic recording device, such as an electromagnetic coil device. These two types of devices are laminated together and serve to read and write data signals, respectively, from and onto magnetic disks, which are the usual magnetic recording media.

In general, a magnetic recording medium, on a microscopic level of composition, is a body in which fine magnetic particles are assembled and held in place in a matrix. Each of these fine magnetic particles has a single magnetic-domain structure, so one recording bit is actually formed by a plurality of neighboring particles. In order to enhance the recording density, therefore, it is necessary to make the magnetic particles smaller in size so as to reduce irregularities at the boundaries of the bits. As the particles are made smaller, however, their volume decreases, so that the thermal stability of the magnetization may deteriorate. This causes a problem.

An index of the thermal stability in magnetization is given by $K_U V/k_B T$. Here, $K_U$ is the magnetic anisotropy energy of a magnetic fine particle, V is the volume of one magnetic fine particle, $k_B$ is the Boltzmann constant, and T is the absolute temperature. Making the magnetic fine particles smaller just reduces V, which lowers $K_U V/k_B T$ by itself, and thereby worsens the thermal stability. Though $K_U$ may be made greater at the same time as a measure to alleviate this problem, the increase in $K_U$ also increases the coercivity of the magnetic recording medium. However, the writing magnetic field intensity produced by a magnetic head is substantially determined by the saturated magnetic flux density of a soft magnetic material constituting a magnetic pole within the head. Therefore, there can be no writing if the coercivity exceeds a permissible value determined by the limit of the writing magnetic field intensity.

One promising technology for solving the problem affecting the thermal stability of magnetized recording media is denoted TAMR, for thermally assisted (or activated) magnetic recording. This approach takes advantage of the fact that coercivity is temperature dependent. Heat is applied locally to a magnetic recording medium immediately before applying a writing magnetic field, particularly while using a magnetic material having a large value of $K_U$. The heat then effectively lowers the medium's coercivity at the same position where the magnetic writing field is applied, so as to enable writing as though it were on a medium with generally lowered coercivity. To apply this approach, a system called a near field transducer (NFT) is used to focus laser power on a small region of the magnetic recording medium, which increases the temperature of an individual magnetic grain to above the Curie temperature. Then, a magnetic field can be used to write data on this grain by aligning its magnetization along the applied field.

In the TAMR recording apparatus, a light (optical radiation) source, such as a semiconductor laser diode, is typically used as the source of thermal energy. Light produced by such a light-emitting device is introduced into an optical waveguide configured to propagate the light. As waveguide core material, TaOx or SiON is typically used. The waveguide is surrounded with cladding material, typically Al2O3, SiON or SiO2. The proper combination of core and cladding supports a travelling mode of electromagnetic radiation at optical frequencies. The waveguide-propagated electromagnetic radiation is transferred to the NFT by electromagnetic coupling. In the present case, the NFT comprises a plasmon generator (PG) adjacent to (above or below) the waveguide at its distal (closest to the ABS) end. Here the radiation in the waveguide couples to a device called a plasmon generator by electromagnetic coupling where it excites plasmon modes in the generator. The plasmon generator is usually made of highly conductive material such as Au or Ag and can be formed in various shapes. In some versions, less conductive material that is more resistant to thermal deformations is used.

The optical radiation coupled by the waveguide to the plasmon generator is in turn transferred to the recording medium via the near-field energy of the plasmons produced by the generator, and this energy locally heats the surface of recording media. Since the plasmon energy is transferred to the magnetic medium by the near field of the plasmon, which is not radiative, rather than by directly focusing the optical radiation of the laser, the size of the region on the recording medium that can be effectively heated is not limited by diffraction effects of the optical radiation and is, therefore, much smaller than would be produced by using the optical radiation directly. The collective apparatus that receives optical energy in the form of laser radiation and converts it to near field energy from generated plasmons is called a near-field transducer (NFT). The NFT typically terminates at the ABS with a small projecting "peg" which further concentrates the near-field energy of the plasmons in as small a region as possible.

A further improvement of TAMR recording is obtained by the addition of optical side shields (OSS) as is disclosed in related application, HT16-003 fully incorporated herein by reference. OSS can improve down-track and cross-track thermal gradients in the recording medium by reducing excessive optical radiation impinging on the recording medium without the necessity of overly reducing the size of the NFT. However, due to photo-lithography limitations, the current process for making the OSS feature has controllability issues, such as the creation of an asymmetrical side gap between OSS and NFT. When such an asymmetry results in one side shield being too close to the NFT body, surface plasmon excitations will be suppressed, leading to lower optical efficiency and higher optical absorption in the NFT body. This will adversely impact the performance and reliability of the head.

SUMMARY

To overcome the limitations in the prior art described above, the present disclosure provides a method of fabricating an OSS feature in a self-aligned manner (a SA-OSS). This will consistently equalize the width of the OSS gap on each side of the NFT by eliminating the aforementioned asymmetry. Therefore:

A first object of this disclosure is to provide an optically shielded TAMR write head that uses optically generated plasmon near-field energy from an NFT for the thermal activation of a magnetic recording medium, thus sharpening the heated region on which recording occurs.

A second object of this disclosure is to provide such an optically shielded TAMR head wherein, by the addition of optical side shields (OSS), down-track and cross-track thermal gradients are improved by sharpening the region within which near-field radiation impinges on the magnetic recording medium.

A third object of this disclosure is to form the OSS in a manner that eliminates asymmetries in the positioning of the sides of the near field transducer (NFT) relative to the OSS.

A fourth object of the present disclosure is to eliminate such asymmetries in a consistent manner by forming the OSS using a self-aligned method (SA-OSS) in which the OSS are self-aligned to the NFT.

A fifth object of the present disclosure is to consistently eliminate such asymmetries across a wafer and from one wafer to another.

In summary, this disclosure is to make a Rh—Au bilayer NFT having a uniform gap between the NFT body and the OSS. The gap extends in a direction proximally away from the ABS, to inside the ABS, and also from left to right in a cross-track direction. The OSS feature is self-aligned to the NFT (a SA-OSS) so that the gap between the NFT and OSS can be precisely and more uniformly controlled across the wafer and from wafer to wafer.

DETAILED DESCRIPTION

As stated above, this disclosure provides a method to make a Rh—Au bilayer near-field transducer (NFT) having an optical side shield (OSS) feature with a uniform gap between the NFT body and the OSS. The gap extends perpendicularly to and proximally away from the ABS, and also transversely (in a cross-track direction) from left to right in the plane of the ABS. The OSS feature is self-aligned to NFT (a SA-OSS) so that forming the OSS gap between NFT and OSS can be precisely and more uniformly controlled, in a symmetric manner, across the wafer and from wafer to wafer.

Referring first to FIGS. 1A-1G, there is shown, schematically, an exemplary stepwise prior-art optical side shield (OSS) fabrication process that is not self-aligned and, therefore, lacks the symmetries of the presently disclosed method.

Figure 1A:
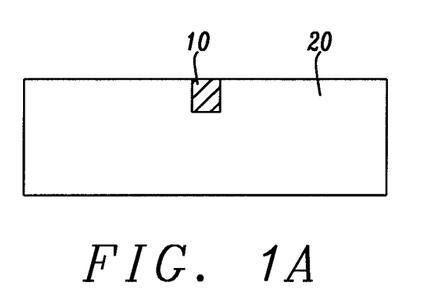
FIGS. 1A-1G schematically show an exemplary prior art optical side shield (OSS) fabrication process.

Referring first to FIG. 1A, there is shown an ABS view of an NFT after CMP. An Rh peg 10 emerges in the ABS, surrounded by an SiO2 or Al2O3 substrate 20.

Figure 1B:
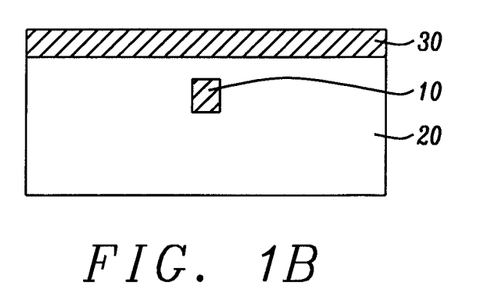

Referring next to FIG. 1B, there is shown a film stack consisting of an Al2O3 20 and a metal mask (MM) 30, a Ta/Ru/NiCr hard mask, in this example, is deposited on top of the NFT layer.

Figure 1C:
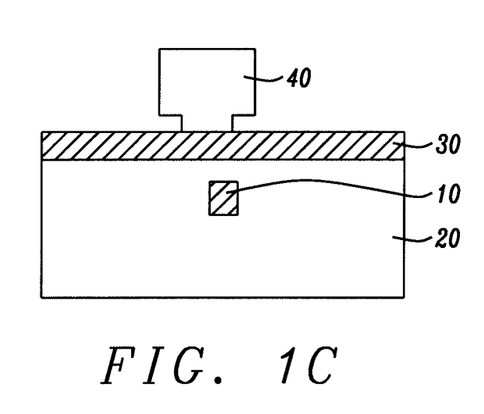

Referring next to FIG. 1C, there is shown a bilayer pedestal photoresist (PR) mask 40 coated on the MM 30 and subsequently patterned with the OSS feature. The mask is intentionally shown off-center, which is the unavoidable result of limitations in PR processes.

Figure 1D:
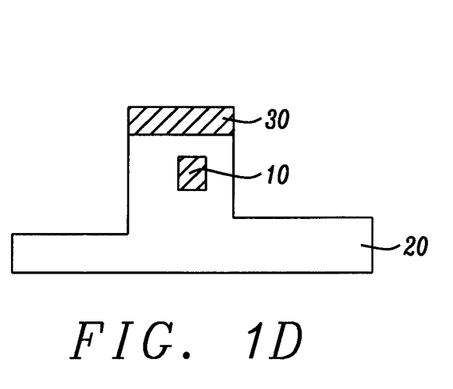

Referring next to FIG. 1D there is shown the result of ion-beam etching (IBE) used to transfer the PR mask 40 pattern into the MM 30. Reactive ion etching (RIE) finishes the patterning of the oxide layers on both side of the NFT. The oxide layers etched by RIE will provide the OSS gap between OSS and NFT. Note that asymmetries of gap width on the sides of the Rh peg 10 due to the limitations of photolithography are intentionally exaggerated in the figures, but these asymmetries are inevitable consequences of patterning processes that are not aligned.

Figure 1E:
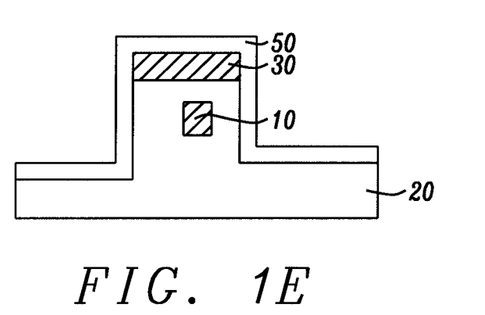
Figure 1F:
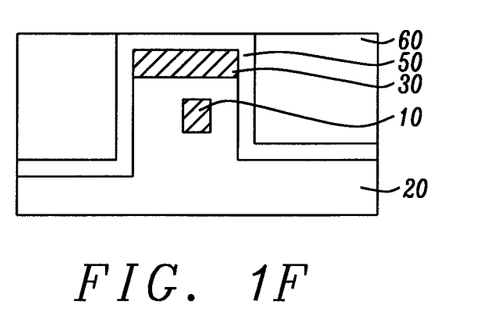

Referring next to FIG. 1E, there is shown a full film of Rh or Ru 50 deposited over exposed surfaces to serve as the OSS and, referring next to FIG. 1F there is shown that a full film of plasma-enhanced chemical vapor deposition (PECVD) $SiO_2$ 60 is deposited, followed by upper surface planarization by CMP.

Figure 1G:
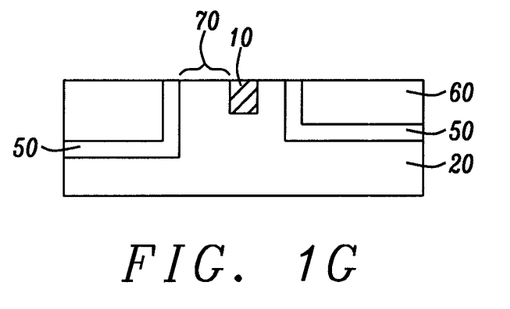

Referring finally to FIG. 1G, there is shown schematically that an IBE has been used to remove the Ru or Rh film 50, and the Ta MM 30 and developer is used to remove the Al2O3 20 from the NFT top. Due to the photolithography limitations, an asymmetrical gap between the vertical portion of the Rh or Ru film 50 and the peg 10 will be an issue during MM pattern transfer step. The width of OSS gap 70 will vary from wafer to wafer and within a wafer.

Having described the prior art fabrication method and shown how it leads to asymmetries, we will now describe the presently disclosed method by referring to schematic FIGS. 2A and 2B to FIG. 8.

Figure 2A:
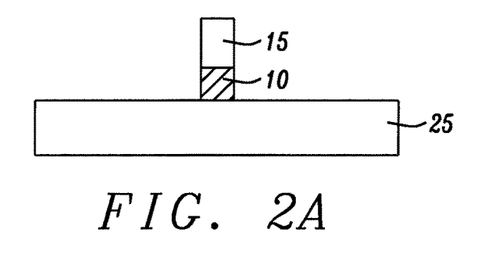
FIG. 2A schematically shows the ABS view of Rh (PEG NFT material) on the upper surface of the dielectric, and thickness is about 20 nm~40 nm, which is patterned by metal mask on top of carbon hard mask process using pattern transfer technique and it also shows the top view of carbon hard mask.
Figure 2B:
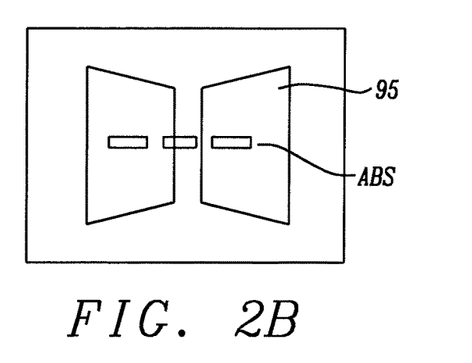
FIG. 2B schematically shows a top view of the structure in FIG. 2A along with a view of the hard mask for patterning the carbon.

Referring first to FIG. 2A, there is shown the ABS view of Rh 10 (peg NFT material) on the upper surface of the dielectric material 25, whose thickness is between about 20 nm~40 nm. The peg has been patterned by IBE with a metal mask on top of a carbon hard mask process using a pattern transfer technique. FIG. 2B shows the top view of the carbon hard mask openings 95 with the ABS (dashed line) indicating the plane of the illustration in FIG. 2A. The metal mask has already been removed.

Figure 3:
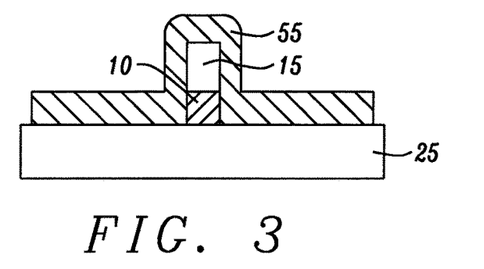
FIG. 3 schematically shows an ABS view of SiO2 or Al2O3 deposited by physical vapor deposition (PVD), ion beam deposition (IBD) or plasma enhanced chemical vapor deposition (PECVD) the thickness of the oxide material will define the final width of OSS gap.

Referring next to schematic FIG. 3, SiO2 or Al2O3 55 is deposited by either PVD (physical vapor deposition), IBD (ion beam deposition), atomic layer deposition (ALD) or PECVD (plasma enhanced chemical vapor deposition). The thickness of the oxide material will define final width of OSS gap. Note that the peg 10 and the carbon top 15 will now align all subsequent deposition processes.

Figure 4:
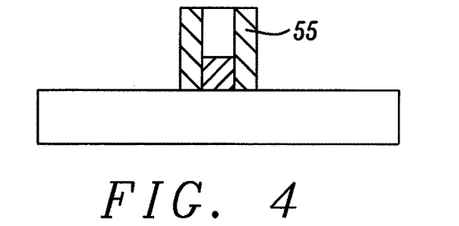
FIG. 4 schematically shows an ABS view of the structure in FIG. 3 after a reactive ion etching (RIE) or ion-beam etching (IBE) process has been applied to remove the oxide material on the top of carbon, and where the oxide material layer on the side of the previous structure is kept during this step.

Referring next to schematic FIG. 4, a reactive ion etch (RIE) or ion beam etching (IBE) is applied to remove the oxide material on the top of the carbon 15 and on the extending dielectric field 25. The oxide material 55 on the sides of NFT remains during this step.

Figure 5:
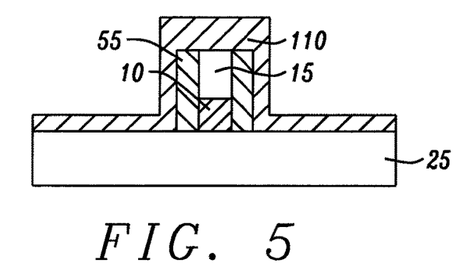
FIG. 5 schematically shows Rh or Ru deposited to form the optical side shields

Referring next to schematic FIG. 5, Rh or Ru 110 is deposited to function as the OSS.

Figure 6:
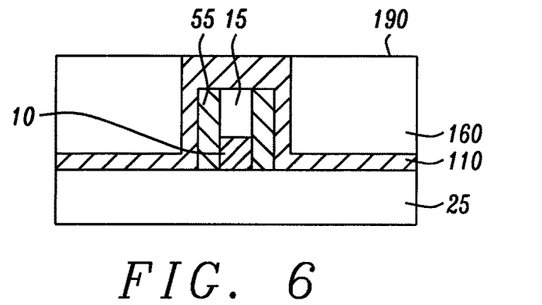
FIG. 6 schematically shows SiO2 or Al2O3 being deposited, followed by planarization by chemical mechanical polishing (CMP).

Referring next to schematic FIG. 6, $SiO_2$ or Al2O3 160 is deposited followed by planarization 190 by CMP (chemical mechanical polishing).

Figure 7:
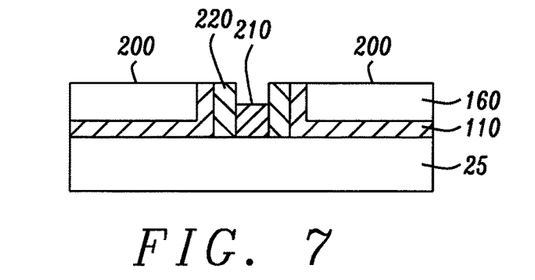
FIG. 7 schematically shows an IBE used to remove the Rh or Ru on top of the carbon hard mask and RIE used to clean the carbon.

Referring next to schematic FIG. 7, an IBE is used to remove the Rh or Ru 110 on top of carbon hard mask 15 and RIE to remove the carbon 15 from NFT top to expose the top of the peg 210.

Figure 8:
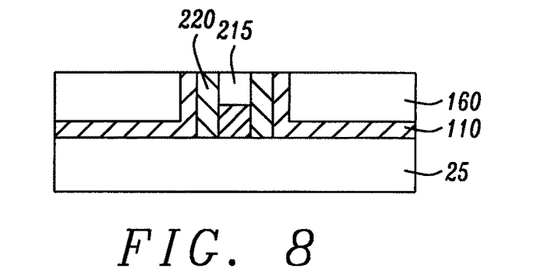
FIG. 8 schematically shows SiO2 deposited by PVD, IBD, ALD or PECVD and followed by CMP planarization to finish the self-aligned optical side shields (SA OSS) process.

Referring next to schematic FIG. 8, SiO2 or Al2O3 215 is deposited by PVD, IBD, ALD or PECVD, filling the region where the carbon 15 had been. This is followed by CMP planarization to finish the SA-OSS process. This newly proposed SA-OSS will create a symmetrical OSS gap 220 of between 20~150 nm, in between the NFT peg, whose thickness is between 20~400 nm and the OSS, with better thickness control, in a range between 20~100 nm.

The following steps refer to the placement of the system fabricated above into an operational hard disk drive (HDD). The TAMR WR with SA-OSS is mounted on a slider and the slider is mounted onto a head gimbal assembly (HGA) as described below.

Figure 9:
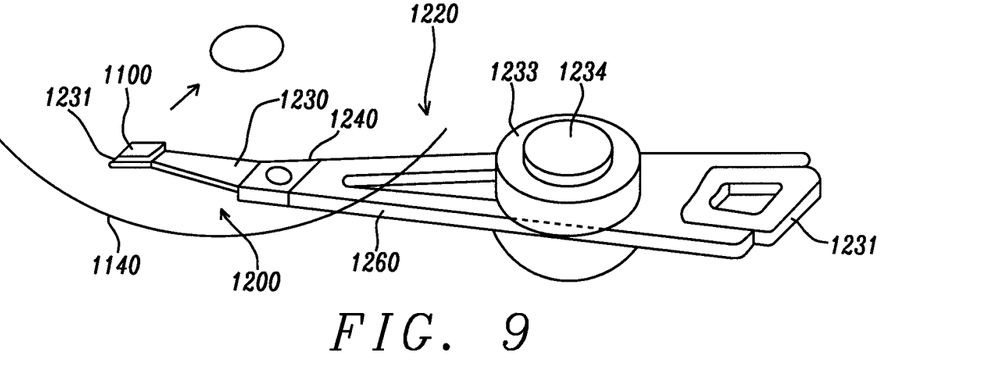
FIGS. 9, 10 and 11 schematically show the device formed according to the disclosed method installed for operation in a hard disk drive (HDD).

Referring next to FIG. 9, there is shown a HGA 1200 that includes a TAMR configured slider-mounted PMR writer 1100, the slider now providing aerodynamic support to the writer when it moves above or below an operational disk recording medium 1140. There is also shown a suspension 1220 that elastically supports the slider-mounted writer 1100. The suspension 1220 has a spring-like load beam 1230 made with a thin, corrosion-free elastic material like stainless steel. A flexure 1230 is provided at a distal end of the load beam and a base-plate 1240 is provided at the proximal end. The slider mounted TAMR writer 1100 is attached to the load beam 1230 at the flexure 1231 which provides the TAMR with the proper amount of freedom of motion. A gimbal part for maintaining the PMR read/write head at a proper level is provided in a portion of the flexure 1231 to which the TAMR 1100 is mounted.

A member to which the HGA 1200 is mounted to arm 1260 is referred to as head arm assembly 1220. The arm 1260 moves the read/write head 1100 in the cross-track direction (arrow) across the medium 1140 (here, a hard disk). One end of the arm 1260 is mounted to the base plate 1240. A coil 1231 to be a part of a voice coil motor (not shown) is mounted to the other end of the arm 1260. A bearing part 1233 is provided to the intermediate portion of the arm 1260. The arm 1260 is rotatably supported by a shaft 1234 mounted to the bearing part 1233. The arm 1260 and the voice coil motor that drives the arm 1260 configure an actuator.

Figure 10:
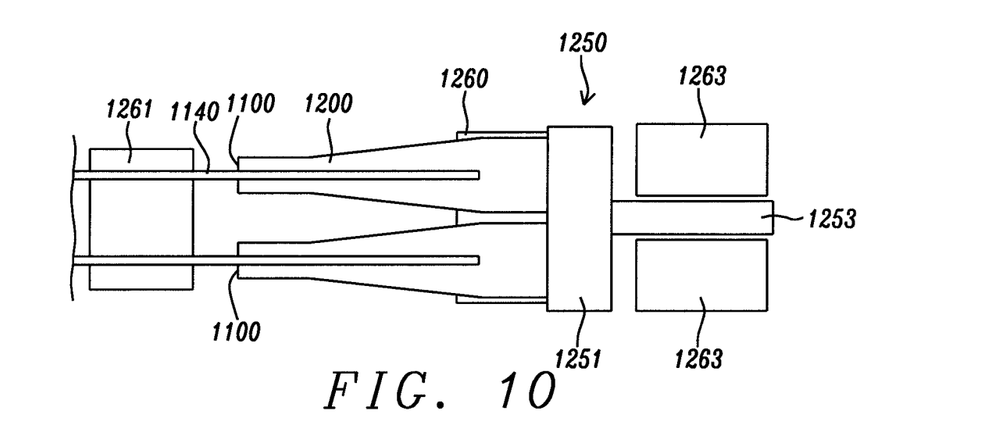
Figure 11:
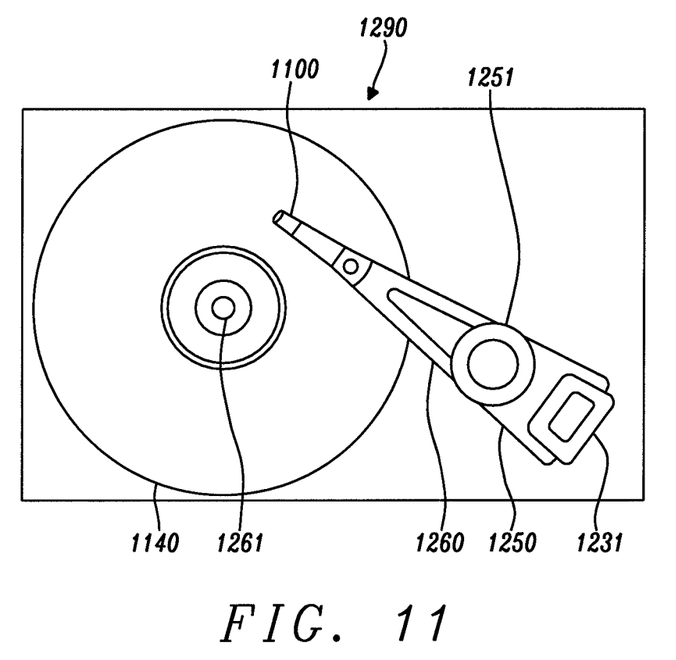

Referring next to FIG. 10 and FIG. 11, there is shown a head stack assembly 1250 and a magnetic recording apparatus in which the slider-mounted TAMR writer 1100 is contained. The head stack assembly is an element to which the HGA 1200 is mounted to arms of a carriage having a plurality of arms for engaging with a plurality of disks 1140. The plurality of disks are mounted on a spindle 1261. FIG. 6 is a side view of this assembly and FIG. 7 is a plan view of the entire magnetic recording apparatus.

Referring finally to FIG. 11, the head stack assembly 1250 is shown incorporated into a magnetic recording apparatus 1290. The magnetic recording apparatus 1290 has a plurality of magnetic recording media 1114 mounted on a spindle motor 1261. Each individual recording media 1114 has two TAMR elements 1100 arranged opposite to each other across the magnetic recording media 14 (shown clearly in FIG. 9). The head stack assembly 1250 and the actuator (except for the write head itself) act as a positioning device and support the PMR heads 1100. They also position the PMR heads correctly opposite the media surface in response to electronic signals. The read/write head records information onto the surface of the magnetic media by means of the magnetic pole contained therein.

Revisions and modifications may be made to methods, materials, structures and dimensions employed in forming and providing an optically shielded, slider-mounted TAMR magnetic write head having an NFT with an emerging peg in which plasmon modes are activated by a waveguide configured to propagate optical frequencies and symmetrically flanked by self-aligned optical side shields, while still forming and providing such a device and its method of formation in accord with the spirit and scope of the present disclosure as defined by the appended claims.

What is claimed is:

1. An optically shielded TAMR (Thermally Assisted Magnetic Recording) write head comprising:

A perpendicular magnetic recording (PMR) magnetic writer having a main write pole emerging at a distal air-bearing surface (ABS);

a near-field transducer (NFT) positioned adjacent to said PMR magnetic writer wherein said NFT comprises a source of near-field plasmon energy that is transferred to a recording media by means of a peg that is emergent at said ABS;

a pair of self-aligned optical side shields (SA-OSS) formed symmetrically to either side of said peg in a cross-track direction and in a direction transverse to said ABS whereby a uniform gap exists between said shields and said peg in each of said directions.

2. The optically shielded TAMR of claim 1 wherein said source of near-field plasmon energy of said NFT is provided by optical energy that is emitted by a laser and transmitted by a waveguide to a distal end where it couples to a source of plasmons.

3. The optically shielded TAMR of claim 1 wherein said SA-OSS are formed of Ru or Rh to a thickness between 20 and 100 nm.

4. The optically shielded TAMR of claim 1 wherein said NFT comprises a plasmon generator formed of a Rh—Au bilayer, with said Au layer being beneath said Rh layer and with said bilayer terminating at said ABS as a Rh peg.

5. A head gimbal assembly, comprising
the PMR write head of claim 1 mounted on a slider;
a suspension that elastically supports said slider-mounted PMR read/write head, wherein
said suspension has a flexure to which said slider-mounted PMR read/write head is joined, a load beam with one end connected to said flexure and a base plate connected to the other end of said load beam.

6. A HDD (Hard Disk Drive), comprising:
the head gimbal assembly of claim 5;
a magnetic recording medium positioned opposite to said slider-mounted TAMR;
a spindle motor that rotates and drives said magnetic recording medium;
a device that supports the slider and that positions said slider relative to said magnetic recording medium.

7. A method for forming an optically shielded TAMR head, comprising:
providing a layered structure comprising a first dielectric material layer, a peg layer formed on said first dielectric material layer and a carbon layer formed on said peg layer;
using a pattern transferring technique and a first etching process, remove portions of said carbon layer and said peg layer from right and left sides of a narrow width vertical region extending vertically downward until reaching a top surface of said dielectric material layer, thereby leaving a narrow vertical structure of uniform width comprising a portion of said carbon layer over an equal width portion of said peg layer, said narrow vertical structure extending upward from a base formed from said dielectric material layer and extending equally to either side of said narrow vertical structure;
using a first deposition method, deposit a uniform film of a first dielectric material over top and sides of said narrow vertical structure and over exposed upper surface of said dielectric material layer extending to the left and right of said narrow vertical structure;
using a second etching process, remove all of said uniform film except that portion covering vertical sides of said narrow vertical structure;
using a second deposition process, deposit a film of OSS material over said narrow vertical structure;
using a third deposition process deposit a layer of second dielectric material over said vertical structure and said film of OSS material;
using a CMP process, planarize said resulting structure down to an upper surface of said film of OSS material;
using a third etching process, remove upper layer portion of OSS material exposing a portion of second carbon layer over said peg layer;
using a fourth etching process remove said exposed second carbon layer;
using a fourth deposition process deposit a third dielectric material over said resulting structure; then
planarizing an upper surface of the resulting structure.

8. The method of claim 7 wherein said uniform film of said first dielectric material covering vertical sides of said peg aligns vertical portions of said OSS and causes them to be uniformly distant from said peg.

9. The method of claim 7 wherein said first and second dielectric layers are layers of SiO2.

10. The method of claim 9 wherein said first and second deposition methods are either physical vapor deposition (PVD), ion beam deposition (IBD), atomic layer deposition (ALD) or plasma enhanced chemical vapor deposition (PECVD).

11. The method of claim 7 wherein said third etching process is an ion beam etch (IBE).

12. The method of claim 7 wherein said fourth etching process is a reactive ion etch (RIE).

* * * * *

UNITED STATES PATENT AND TRADEMARK OFFICE
CERTIFICATE OF CORRECTION

| | | |
|---|---|---|
| PATENT NO. | : 11,011,192 B1 | Page 1 of 1 |
| APPLICATION NO. | : 16/800036 | |
| DATED | : May 18, 2021 | |
| INVENTOR(S) | : Weihao Xu et al. | |

It is certified that error appears in the above-identified patent and that said Letters Patent is hereby corrected as shown below:

In the Specification

In Column 1, Line 7, delete US Serial Number "10/069,596" and replace with -- 10/068,596 --, and at Column 1, Line 9, delete US Patent Number "1,018,628" and replace with -- 10,186,288 --.

Signed and Sealed this
Twenty-second Day of November, 2022

Katherine Kelly Vidal
*Director of the United States Patent and Trademark Office*